(12) United States Patent
Hao et al.

(10) Patent No.: US 10,998,840 B2
(45) Date of Patent: May 4, 2021

(54) ELECTRIC DRIVE SYSTEM WITH RECONFIGURABLE MACHINE WINDINGS

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Rashmi Prasad, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/570,166

(22) Filed: Sep. 13, 2019

(65) Prior Publication Data

US 2021/0083612 A1    Mar. 18, 2021

(51) Int. Cl.
   *H02P 25/18* (2006.01)
   *H02P 27/08* (2006.01)
   *B60L 50/51* (2019.01)
   *B60L 50/60* (2019.01)

(52) U.S. Cl.
   CPC ............ *H02P 25/188* (2013.01); *H02P 27/08* (2013.01); *B60L 50/51* (2019.02); *B60L 50/60* (2019.02); *B60L 2210/40* (2013.01); *B60Y 2200/91* (2013.01); *B60Y 2400/604* (2013.01); *B60Y 2400/61* (2013.01)

(58) Field of Classification Search
   CPC ..... Y02T 10/64; Y02T 10/70; Y02T 10/7072; H02T 10/72; B60L 240/421; B60L 50/60; B60L 50/51; B60L 2210/40; H02P 25/188; H02P 27/08; B60Y 2200/91; B60Y 2400/604; B60Y 2400/61
   See application file for complete search history.

(56) References Cited

U.S. PATENT DOCUMENTS

| | | | |
|---|---|---|---|
| 9,621,099 B1 | 4/2017 | Namuduri et al. | |
| 9,882,521 B2 | 1/2018 | Namuduri et al. | |
| 2014/0217946 A1* | 8/2014 | Kume | H02P 6/08 318/497 |
| 2015/0061423 A1* | 3/2015 | Nagao | H02K 11/21 310/52 |
| 2016/0141996 A1* | 5/2016 | Kim | B60L 50/15 318/497 |

* cited by examiner

*Primary Examiner* — Eduardo Colon Santana
*Assistant Examiner* — Zoheb Imtiaz
(74) *Attorney, Agent, or Firm* — Quinn IP Law

(57) ABSTRACT

An electric drive system includes a battery pack, a power inverter module ("PIM"), an electric machine, a switching circuit, and a controller. The electric machine has three or more phase legs. The PIM has a DC-side connected to the battery pack, and an alternating current ("AC")-side connected to the electric machine. The switching circuit includes AC switches, and for each phase leg also includes three or more winding sections each electrically connectable to or disconnectable from the battery pack and PIM via the AC switches. The controller commands a binary switching state of each respective AC switch based on the rotary speed to implement one of three different speed-based operating modes of the electric machine, and to thereby vary a conductive path from the PIM to the electric machine through one or more of the connected winding sections.

18 Claims, 5 Drawing Sheets

Fig-4

| OM | S1 | S2 | S3 | S4 | S5 | S6 | |
|----|----|----|----|----|----|----|---|
| LS | O | O | O | O | X | X | (A1 + A2 + A3)<br>(B1 + B2 + B3)<br>(C1 + C2 + C3) |
| MS | O | O | X | X | O | O | (A1 + A2)<br>(B1 + B2)<br>(C1 + C2) |
| HS | X | X | O | O | O | O | (A1), (B1), (C1) |

| OM | SA1 | SB1 | SC1 | SA2 | SB2 | SC2 | SA3 | SB3 | SC3 | |
|----|-----|-----|-----|-----|-----|-----|-----|-----|-----|---|
| LS | X | X | X | O | O | O | O | O | O | (A1 + A2 + A3)<br>(B1 + B2 + B3)<br>(C1 + C2 + C3) |
| MS | O | O | O | X | X | X | O | O | O | (A2 + A3)<br>(B2 + B3)<br>(C2 + C3) |
| HS | O | O | O | O | O | O | X | X | X | (A3), (B3), (C3) |

70

ELECTRIC DRIVE SYSTEM WITH RECONFIGURABLE MACHINE WINDINGS

INTRODUCTION

Rotary electric machines are commonly embodied as electric motors, electric generators, or combined motor-generator units. For instance, a high-voltage electric traction motor may be used as a prime mover within a transmission or an electric drive unit ("EDU"). Alternatively, motor output torque produced by the electric machine operating in a power generating mode may be used to produce electricity, which in turn may be used to power one or more electrical devices and/or to recharge a direct current ("DC") battery pack.

Electric drive systems may employ a polyphase/alternating current ("AC") electric machine that includes a rotor shaft mounted to a rotor hub. In some machine configurations, permanent magnets are surface-mounted to and/or embedded within laminations of the rotor hub. A stator that is concentrically arranged with the rotor has multiple stator teeth. Stator slots defined between adjacent stator teeth are wound with wire or bar-style conductors to form individual stator windings. A rotating magnetic field results when the stator windings are energized by an AC input voltage. Interaction of the stator and rotor fields ultimately causes rotation of the rotor shaft.

Electrical systems using an AC electric machine in conjunction with DC battery packs use a power inverter module ("PIM") to convert a DC input voltage to an AC output voltage, as well as to rectify an AC input voltage, with PIM operation controlled in an operating mode-specific manner. The PIM, which is situated on a high-voltage bus between the battery pack and the electric machine, has multiple pairs of high-voltage semiconductor switches, with each switch having an independently-controlled ON/OFF switching state. The switching states are controlled via pulse width modulation ("PWM"), pulse-density modulation ("PDM"), or other switching control signals. An ON switching state corresponds to a conducting/closed state of the semiconductor switch, while an OFF state corresponds to a non-conducting/open state. Thus, control of the switching states of the PIM switches in motoring or generating modes delivers current respectively to or from the individual phase leads of the electric machine.

SUMMARY

An electric drive system and method as described herein may be used to enhance the overall power, torque, and range capabilities of a polyphase/alternating current ("AC") electric machine in a fault-tolerant manner. In a representative embodiment, the electric drive system includes, in addition to the electric machine, a controller, a direct current ("DC") power supply, e.g., a battery pack, and a power inverter module ("PIM") that is electrically connected to the DC power supply. The electric machine, which is electrically connected to an AC-side of the PIM, is connected to or integrally formed with a switching circuit having low-loss bi-directionally controllable wide-bandgap ("WBG") semiconductor switches, also referred to below as "bidirectional AC switches", in addition to reconfigurable phase windings. That is, each phase winding, e.g., the A-phase, B-phase, and C-phase windings in an exemplary three-phase embodiment using nominal A, B, and C phases, is separated into three or more discrete winding sections. The controller delivers current to the electric machine in three different operating modes to thereby increase the available output torque from the electric machine at higher machine speeds, i.e., relative to possible torque capabilities using unitary phase windings.

As set forth herein, a "full" phase winding equivalent to the above-noted unitary phase winding is divided into three or more discrete winding sections. The full phase winding is fully constructed in a given phase leg of the electric machine when its three or more constituent winding sections are connected together in series, which occurs via mode-based switching state control of the individual AC switches. Similarly, a partial phase winding is constructed when at least one but fewer than all of the winding sections are interconnected in a given phase leg. The particular full or partial winding configuration is selected in real-time by the controller based on a rotary speed of the electric machine, e.g., a requested, commanded, or measured speed of a rotor thereof, or a related speed such as a wheel speed of a road wheel in an exemplary motor vehicle embodiment.

The three different speed-dependent machine operating modes, i.e., (1) a low-speed mode, a medium-speed mode, and a high-speed mode. Moreover, each of the three distinct modes has a corresponding set of switching states of the AC switches and a corresponding speed threshold governing entry into the mode, which may be encoded in a lookup table and executed in real-time by the controller during operation of the electric drive system.

In the various embodiments, the electric drive system includes a switching circuit having a plurality of AC switches. Additionally, for each of the three or more phase legs there are three or more winding sections, each of which is electrically connectable to or disconnectable from the DC power supply and the PIM by operation of the AC switches. The controller is configured to command a binary switching state of each respective one of the AC switches based on a rotary speed of the electric machine to thereby implement one of the above-noted three different speed-based operating modes, and to thereby vary a conductive path from the PIM to the electric machine through the winding sections.

The electric machine in some embodiments has three phase legs, three winding sections for each of the three phase legs, and at least six of the AC switches.

The AC switches may be wide-bandgap ("WBG") switches, e.g., Gallium nitride ("GaN"), Gallium oxide ("GaO"), or Silicon carbide ("SiC") switches. The AC switches may be integrated within the electric machine in some configurations, or used as part of a separate switching circuit or integrated into the PIM in other configurations.

The speed-based operating modes may include, as noted above, the low-speed, medium-speed, and high-speed operating modes. In the low-speed mode, all of the winding sections of each respective phase leg are connected in series to each other and to the PIM at a first rotary speed of the electric machine, with this action occurring via a first ON/OFF switching combination of the semiconductor switches. In the medium-speed mode, at least two but fewer than all of the winding sections for each respective one of the phase legs is connected to the PIM at a second rotary speed of the electric machine, via a second ON/OFF switching combination of the semiconductor switches. In the high-speed operating mode, only one of the winding sections for each respective one of the phase legs is connected to the PIM at a third rotary speed of the electric machine via a third ON/OFF switching combination of the semiconductor switches.

The controller may be configured to time an opening or a closing of each of the AC switches based on a zero-crossing of a phase current of the electric machine.

The winding sections may have a predetermined turn ratio configured to provide a predetermined power or torque from the electric machine. For instance, when the electric machine is a three-phase electric machine having first, second, and third winding sections in each of three of the phase legs, with the first winding section being closest to the PIM, the predetermined turn ratio of the respective first, second, and third winding sections may be 2:1:1 in a possible configuration.

The electric machine may have at least twice as many of the AC switches as a number of the winding sections in each respective one of the phase legs. For instance, a number (N) of the AC switches is represented as N=(n)(m−1), where (n) is the number of the winding sections in each of the phase legs and (m) is the total number of the phase legs.

Some embodiment of the electric machine may have at least four operating modes based on winding sections. The number of operating modes may be equal to the number of winding sections.

The electric machine may be optionally coupled to road wheels of a motor vehicle and configured to propel the vehicle via rotation of at least some of the road wheels.

A method is also disclosed for controlling the electric machine in the electric drive system. An embodiment of the method includes providing, between the PIM and the electric machine, a plurality of AC switches, and providing, for each phase leg of the electric machine, three or more series-connectable winding sections. The method also includes determining a rotary speed of the electric machine via a controller, and then commanding a binary switching state of each respective one of the AC switches based on the rotary speed to thereby implement one of the three different speed-based operating modes of the electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIGS. 4 and 5 are tables describing corresponding states of various AC switches used within the exemplary circuit topologies of FIGS. 1 and 2, respectively.

Figure 1:
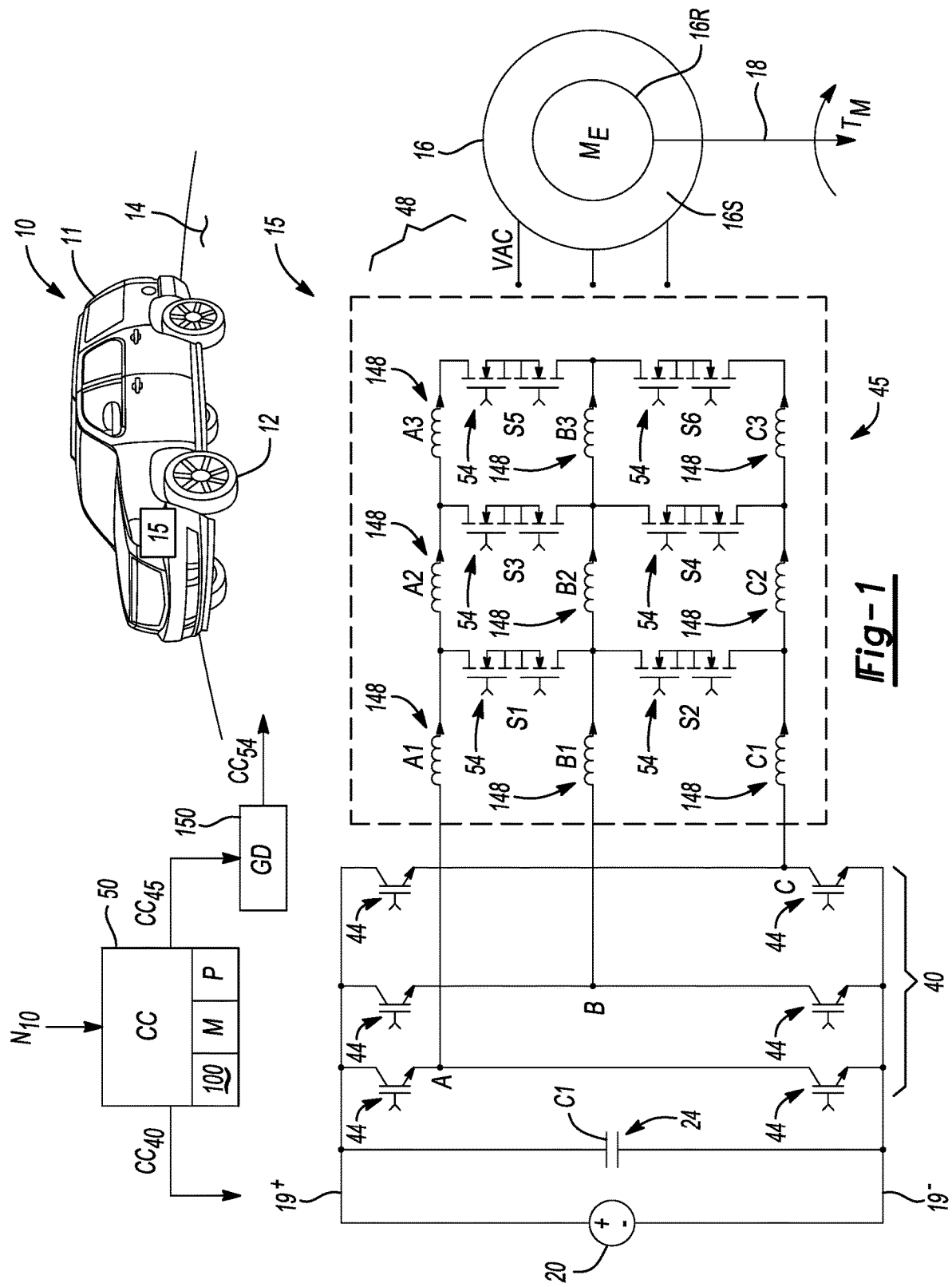
FIG. 1 is a schematic illustration of a motor vehicle having an electric drive system configured and controlled as set forth herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers refer to like components throughout the several views, FIG. 1 depicts a schematic vehicle 10 having a vehicle body 11 and an electric drive system 15. The vehicle 10 may be configured as a motor vehicle as shown, and therefore may be equipped with a set of road wheels 12 in rolling contact with a road surface 14. The electric drive system 15 includes an alternating current ("AC")/polyphase electric machine ("$M_E$") 16 a stator 16S and a rotor 16R, with the rotor 1R being mechanically coupled to a rotor shaft 18. Thus, when the electric machine 16 is energized, motor output torque (arrow $T_M$) is delivered to the road wheels 12 or another coupled load via the rotor shaft 18. Other suitable applications or platforms for the electric drive system 15 may be readily envisioned, including but not limited to stationary power plants, mobile platforms, and other types of land, air, or marine vehicles. For illustrative consistency, the vehicle 10 will be described herein after as a motor vehicle without limitation.

As described in detail below, the electric machine 16 has three or more electrical phases, and thus three or more corresponding phase windings/legs 48. Each phase leg 48 is formed from three or more individual winding sections 148. The winding sections 148 are integral to the stator 16S, and are shown separately in FIGS. 1 and 2 solely for illustrative clarity. The winding sections 148 are selectively connectable to or disconnectable in series in different combinations for a given phase leg 48, with the connection of the windings sections 148 occurring automatically by action of a controller (CC) 50 based on an actual or requested rotary speed (arrow $N_{10}$) of the electric machine 16 and/or the motor vehicle 10. Control of the electric machine 16 to achieve the desired control response in such a speed-dependent manner is described below with reference to FIGS. 3-6.

When the electric machine 16 is energized via application of an AC/polyphase voltage ("VAC") to the individual phase legs 48, the motor output torque (arrow $T_M$) is generated and delivered to a coupled load, such as to the road wheels 12 to propel the vehicle 10 in the exemplary motor vehicle application. The electric machine 16 may be embodied as a three-phase/multi-phase motor or motor/generator unit in a simplified embodiment, with each of the phase legs 48 carrying a corresponding phase current. Alternatively, the electric machine 16 may have more than three electrical phases/phase legs 48, e.g., a five-phase or seven-phase machine, with the present teachings readily extendable to such configurations as will be readily appreciated by those of ordinary skill in the art.

The electric drive system 15 shown in FIG. 1 includes a direct current ("DC") energy storage device such as a battery pack 20, as well as a power inverter module ("PIM") 40. The DC battery pack 20 may include an application specific number of rechargeable battery cells, e.g., lithium ion or nickel metal hydride, and a capacitor ("C1") 24 arranged in electrical parallel with the DC battery pack 20. A battery output voltage is delivered to respective positive and negative voltage DC bus rails $19^+$ and $19^-$. The PIM 40 in turn is electrically connected to the DC bus rails $19^+$ and $19^-$, with the various electrical phases (e.g., A-phase, B-phase, and C-phase as shown) connected to corresponding phase legs 48 of the electric machine 16.

Within the depicted example circuit topology of FIG. 1, the PM 40 includes semiconductor switches ("inverter switches") 44 arranged in upper and lower sets as shown, with the terms "upper" and "lower" referring to the inverter switches 44 connected to the positive and negative DC bus rails $19^+$ and $19^-$, respectively. The inverter switches 44 may be variously embodied as low-loss, electronically-controlled semiconductor switching devices, e.g., in the form of insulated gate bipolar transistors ("IGBTs"), metal-oxide semiconductor field effect transistors ("MOSFETs"), or other suitable switches having a corresponding gate terminal to which a voltage signal is applied to change the binary ON/OFF conducting state of a given one of the inverter switches 44. As will be readily understood by those of ordinary skill in the art, the inverter switches 44 may be turned OFF or ON as needed at a high switching frequency, e.g., via pulse width modulation ("PWM"), pulse density modulation ("PDM"), or another switching control technique in order to rectify or convert the AC or DC bus voltages as needed.

With respect to the reconfigurable winding configuration of the electric machine 16, FIG. 1 shows a simplified three-phase embodiment in which the electric machine 16 has an integral switching circuit 45 that includes a set of high-voltage, bi-directional, wide-bandgap ("WBG") semiconductor switches, hereinafter referred to as "AC switches" 54, in addition to the above-noted phase legs 48. Alternatively, the switching circuit 45 may be packaged external to the electric machine 16, e.g., disposed between the PIM 40 and the electric machine 16, or the switching circuit 45 may be integrated into the PIM 40 in different configurations.

The AC switches 54 are respectively labeled S1, S2, S3, S4, S5, and S6 for clarity. Non-limiting exemplary variations of the AC switches include Silicon carbide ("SiC"), Gallium-nitride ("GaN"), or Gallium-oxide ("GaO") switches, a pair of which may be connected back-to-back to form a bi-directional modular switch. Such configurations provide the requisite high-voltage/low resistance capabilities for performing the described speed-based control functions. For example, the AC switches 54 may have switching times of less than 1 ms, and may be rated for currents of up to 600 A and voltages of up to 2000V or more depending on the requirements of the application. Each of the phase legs 48, e.g., the A-phase, B-phase, and C-phase windings of the depicted exemplary three-phase embodiment of the electric machine 16, is separated into three or more of the winding sections 148, i.e., winding sections A1, A2, and A3 for the A-phase, winding sections B1, B2, and B3 for the B-phase, and winding sections C1, C2, and C3 for the C-phase. Configurations having more than three electrical phases could be similarly configured for each additional phase in excess of three. When embodied as a three-phase electric machine 16 as shown, the electric machine 16 has a total of six AC switches 54, with three winding sections 148 used in each respective one of the phase windings 48.

One, two, or three of the three illustrated winding sections 148 are selectively connected in series to the PIM 40 for each respective electrical phase during different speed-based operating modes of the electric machine 16, which varies a conductive path from the PIM 40 to the electric machine 16 through the winding sections 148. This is accomplished via switching control operation of the various AC switches 54, with the particular winding configuration selected in real-time by the controller 50 based on the speed ($N_{10}$), e.g., of the vehicle 10 such as a road speed, a rotational speed of the electric machine 16, or a function of both, whether requested, commanded, or measured. The controller 50, which is in communication with the electric machine 16 over a controller area network or other communication bus, may be configured as a single device or as a distributed control device.

Although omitted from FIG. 1 for illustrative simplicity, connectivity of the controller 50 to the electric drive system 15 and its constituent components may include transfer conductors and/or wireless control links or paths suitable for transmitting and receiving inverter switching control signals (arrow $CC_{40}$) to the semiconductor switches 44 of the PIM 40. A WBG gate drive ("GD") circuit 150 may be used in conjunction with the controller 50, or its functionality integrated into the controller 50, with the gate drive circuit 150 configured to receive machine switching control signals (arrow $CC_{45}$) and output gate signals (arrow $CC_{54}$) to the AC switches 54 as part of the method 100.

The controller 50 may also include one or more processors (P)/cores and sufficient tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry. Computer-readable instructions are recorded in memory (M) embodying the present method 100, with the execution of such logic by the processor (P) ultimately causing the controller 50 to manage the flow of electrical power within the electric drive system 15.

The method 100, as applied to FIG. 1, is described below in an embodiment with reference to the table 60 of FIG. 4 and the flow chart of method 100 shown in FIG. 6. In this exemplary topology, with (m) electrical phases/phase legs and (n) winding sections 148, and with the number of available operating modes equaling the number (n) of winding sections 148, a number (N) of the AC switches 54 may be represented as N=(m−1)(n). Thus, six of the AC switches 54 are used in a simplified three-phase embodiment of the circuit topology of FIG. 1.

Figure 2:
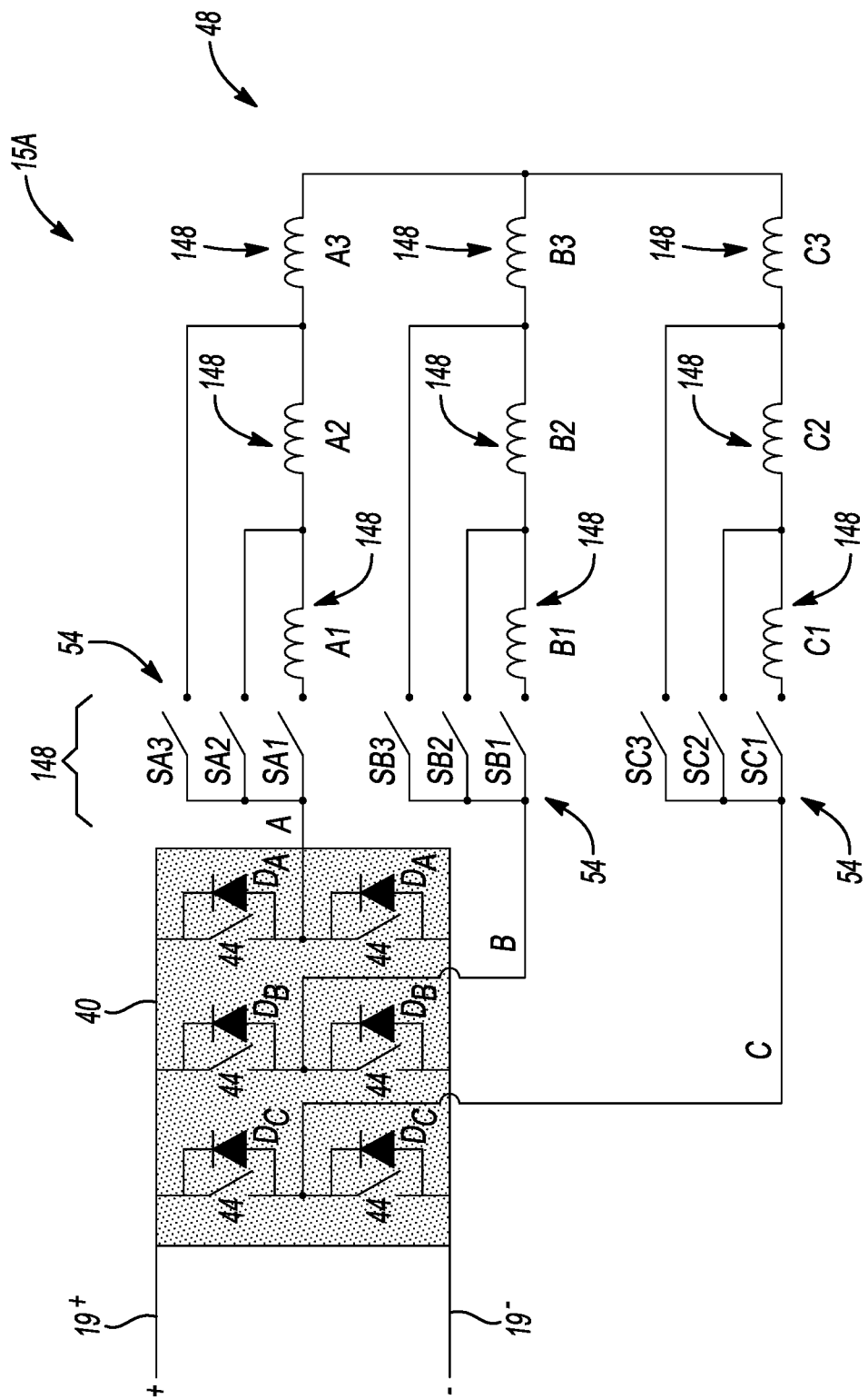
FIG. 2 is a schematic illustration of an alternative embodiment of the electric drive system shown in FIG. 1.

An alternative electric drive system 15A and corresponding circuit topology is depicted in FIG. 2. The AC switches 54 configured as described above but depicted schematically as mechanical switches for illustrative simplicity. Additionally, the PM 40 is depicted with multiple half-bridges with inverter switches 44 paired with a corresponding diode DA, DB, or Dc depending on the phase of the electric machine 16, i.e., electrical phases A, B, and C in the illustrated three-phase configuration. In this alternative topology, the AC switches 54 have a number (N) that is equal to the product of the number (m) of electrical phases and the number (n) of windings sections 148, i.e., N=(m)(n). In the example three-phase embodiment with three winding sections 148 per phase leg 48, therefore, there are a total of nine AC switches 54, i.e., N=9.

Figure 3:
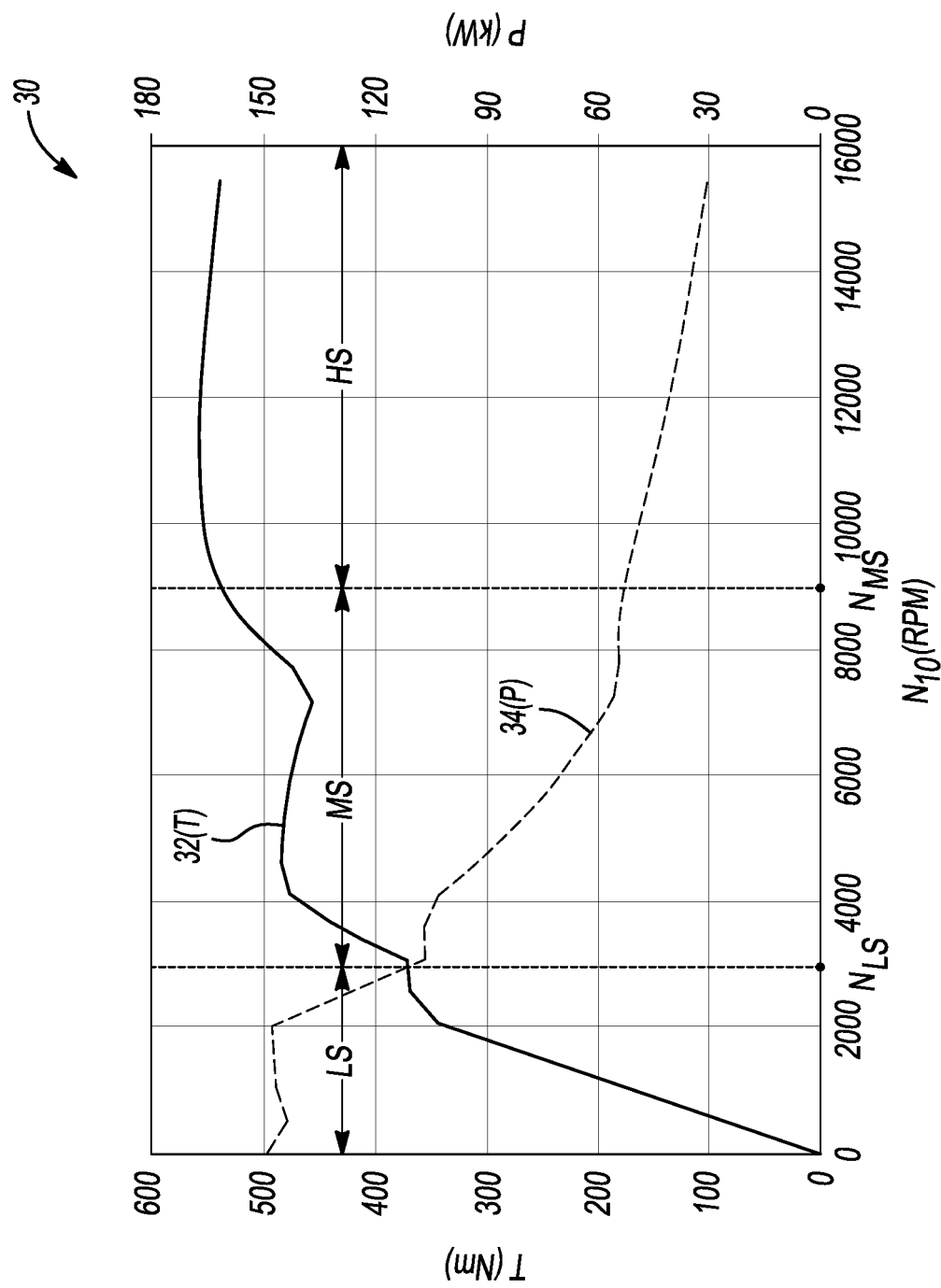
FIG. 3 is a three-axis plot of torque, power, and speed, with speed depicted on the horizontal axis and torque and power depicted on the vertical axes.

Referring briefly to the three-axis plot 30 of FIG. 3, the two example circuit topologies of FIGS. 1 and 2 enable operation of the electric machine 16 in the above-noted low-speed ("LS"), medium-speed ("MS"), and high-speed ("HS") operating modes. Plot 30 includes trace 32(T), which represents motor output torque ($T_M$) of FIG. 1, in Newton-meters (Nm), and trace 34(P), i.e., motor power in kilowatts (kW). The particular rotational speeds ($N_{10}$) used as respective thresholds for entering the three operating modes are application-specific, and thus may be programmed into a lookup table and used in real-time by the controller 50. Such speeds are depicted in revolutions per minute (RPM). Mathematically, the number of speed-based operating modes ("NSOM") of the electric drive system 16 may be represented as n, where n is the number of winding sections 148 per phase leg. So, in the exemplary three-phase embodiment of FIG. 1, where n=3, then NSOM=3, i.e., a total of three speed-based operating modes are implemented via the method 100.

A table 60 is shown in FIG. 4 that corresponds to the circuit topology of FIG. 1, and that illustrates the switching states of the AC switches 54 (also labeled S1, S2, S3, S4, S5, and S6) for a given speed-based operating mode ("OM") of the electric machine 16, i.e., the low-speed ("LS"), medium-speed ("MS"), and high-speed "HS" modes. Each mode has its own speed threshold. For instance, in the low-speed mode, a first rotary speed of the electric machine 16 may be used to determine when to implement a first ON/OFF switching combination of the AC switches, with progressively higher second and third rotary speeds (and second and third ON/OFF switching combinations) used for the medium-speed and high-speed operating modes.

As will be appreciated, a given AC switch 54 conducts electricity when it is in an ON state, i.e., closed. An "X" character is used in table 60 to indicate the conducting state of a corresponding AC switch 54. Likewise, an AC switch 54 is placed in a non-conducting state when it is turned OFF, i.e., when opened. An "O" character is used to represent such a switching state.

In the low-speed ("LS") operating mode, the winding sections 148 located in each respective one of the phase legs 48 of the electric machine 16 are connected to each other in series, as well as to the PIM 40. In a three-phase embodiment, for instance, each phase leg 48 would therefore have three respective winding sections 148 connected in series, and thus the phase legs 48 are fully energized via the PIM 40. However, in the low-speed operating mode just one of the winding sections 148 of each phase leg 48 is connected to the PIM 40. The AC switches 54 labeled S, S2, S3, and S4 in FIG. 1 are commanded open, and the AC switches 54 labeled S5 and S6 are closed. Winding sections 148 (A1, A2, A3) of phase A, (B1, B2, and B3) of phase B, and (C1, C2, and C3) of phase C are thus connected in series to the PIM 40 and thereby energized.

The medium-speed ("MS") operating mode may be commanded at a predetermined rotary speed between lower and higher speed thresholds corresponding to the low-speed and high-speed modes, respectively. At least two but fewer than all available winding sections 148 for each respective electrical phase are connected in series to each other and to the PIM 40 in the medium-speed operating mode. The AC switches 54 labeled S1, S2, S5, and S6 in FIG. 1 are commanded open, and the AC switches 54 labeled S3 and S4 are commanded closed. Winding sections 148 (A1, A2) of phase A, (B1, B2) of phase B, and (C1, C2) of phase C are connected in series to the PIM 40 and thereby energized.

In the high-speed ("HS") operating mode, a single winding section 148 for each respective phase leg 48 is connected to the PIM 40. The AC switches 54 labeled S3, S4, S5, and S6 in FIG. 1 are commanded open, and the AC switches 54 labeled S1 and S2 are commanded closed. Winding sections 148 (A3) of phase A, (B3) of phase B, and (C3) of phase C are connected to the PIM 40 and thereby energized.

FIG. 5 depicts another table 70 that corresponds to the circuit topology of FIG. 2. As with the table 60 of FIG. 3, table 70 illustrates the switching states of the AC switches 54 (also labeled SA1, SA2, SA3, SB1, SB2, SB3, and SC1, SC2, SC3) for a given speed-based operating mode of the electric machine 16.

In the low-speed ("LS") operating mode, the AC switches 54 labeled SA1, SB1, and SC1 in FIG. 2 are commanded closed. The remaining AC switches 54 are commanded open. Winding sections 148 (A1, A2, A3) of phase A, (B1, B2, and B3) of phase B, and (C1, C2, and C3) of phase C are connected in series to the PIM 40 in this mode and thereby energized.

In the medium-speed ("MS") operating mode, at least two but fewer than all available winding sections 148 for each respective phase leg 48 are connected in series to each other and to the PIM 40. The AC switches 54 labeled SA2, SB2, and SC2 in FIG. 2 are commanded closed, and the remaining AC switches 54 are commanded open. Winding sections 148 (A2, A3) of phase A, (B2, B3) of phase B, and (C2, C3) of phase C are connected in series to the PIM 40 and thereby energized.

In the high-speed ("HS") operating mode, a single winding section 148 for each respective phase leg 48 is connected to the PIM 40. The AC switches 54 labeled SA3, SB3, and SC3 in FIG. 2 are commanded closed. At the same time, the remaining AC switches 54 are commanded open. Winding sections 148 (A3) of phase A, (B3) of phase B, and (C3) of phase C are connected to the PIM 40 and thereby energized.

Figure 6:
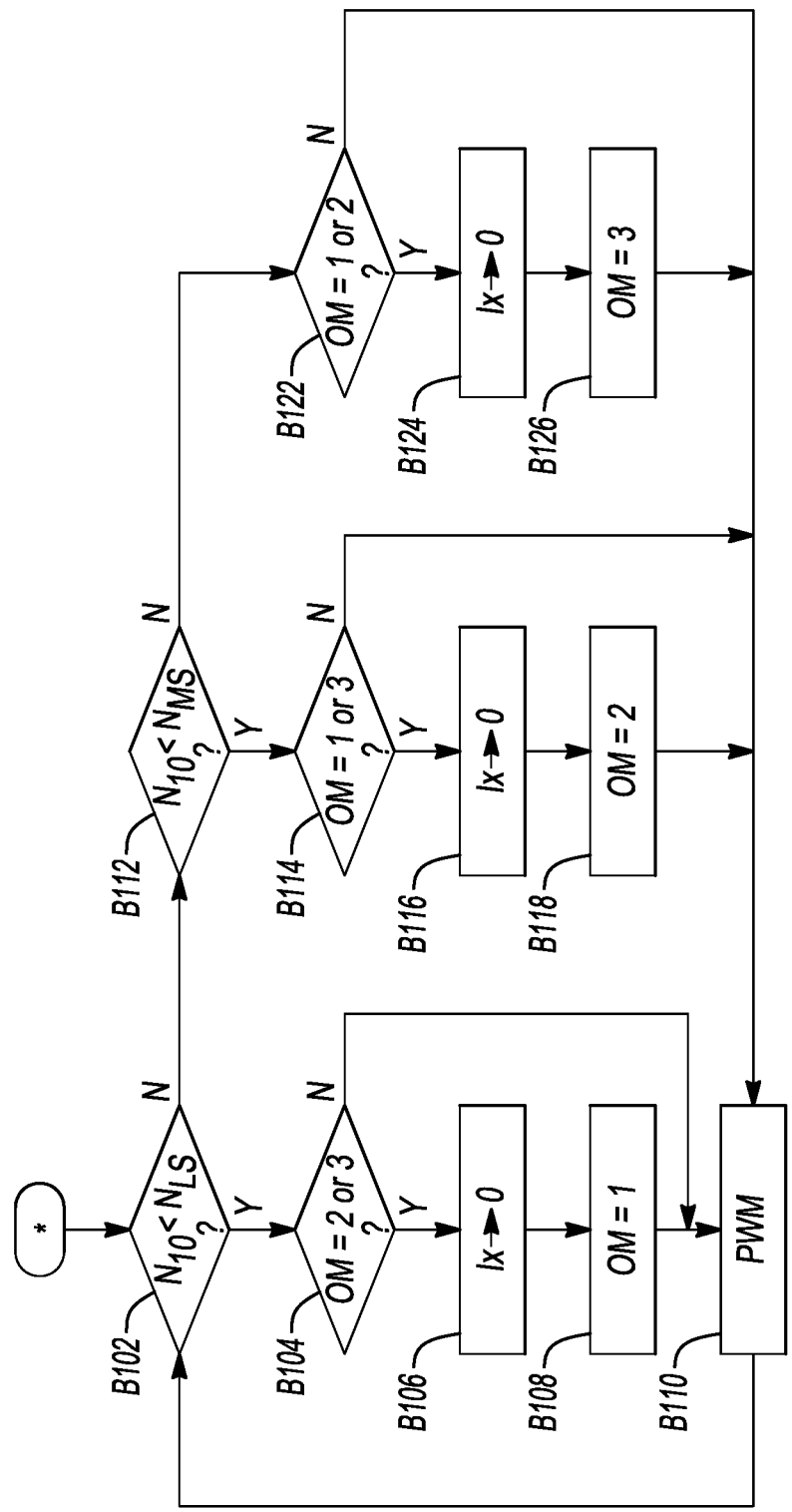
FIG. 6 is a flow chart describing a method for controlling the electric drive systems of FIGS. 1 and 2.

Referring to FIG. 6, the method 100 is described according to an exemplary embodiment. Upon initiating the controller 50 of FIG. 1 at the onset of method 100, which is represented by "*" in FIG. 1, the controller 50 determines the rotary speed ($N_{10}$), e.g., by measuring a speed of the rotor 16R and/or a road wheel 12 using a rotary encoder as will be appreciated in the art, or by calculating or receiving a requested speed in different embodiments. The controller 50 thereafter compares the rotary speed ($N_{10}$) to a first speed threshold ($N_{LS}$) corresponding to the low-speed operating mode explained above. Such a speed threshold may be pre-recorded in memory (M) of the controller 50 and referenced in real-time by the controller 50. The method 100 proceeds to block B104 if the rotary speed is less than the first speed threshold, and to block B112 in the alternative.

Block B104 includes determining, via the controller 50, whether the electric machine 16 is presently operating in either of the medium-speed or high-speed operating modes. The method 100 proceeds to block B106 if either the medium-speed or the high-speed mode is active. The method 100 proceeds in the alternative to block B110 if the electric machine 16 is already operating in the low-speed operating mode.

Block B106 may entail executing a control loop until the phase current in a particular phase leg 48 is zero, or comes within an allowable tolerance thereof, as represented by "Ix→0" in FIG. 6, with the "x" subscript indicating the relevant phase current. The controller 50 may be configured to time opening or closing of the AC switches 54 of the particular phase leg 48 based on a zero-crossing of the phase current.

Such a process may ensure that the winding sections 148 of a particular phase leg 48 are not switched into or out of series with the PIM 40 until the corresponding phase current is zero. That is, even if a command is received to change operating modes, block B106 may include waiting until the phase current is essentially zero before switching control is executed for connecting/disconnecting the constituent winding sections 148. Alternatively, block B106 may not be used, in which case the winding sections 148 are switched on or off regardless of the phase current. Such an embodiment remains viable, albeit with a higher probability of undesirable transient effects. The method 100 then proceeds to block B108.

At block B108, the controller 50 next initiates a transition to the low-speed operating mode by commanding the AC switches 54 ON or OFF as shown in respective tables 60 and 70 of FIGS. 3 and 4. In the FIG. 1 circuit topology, for instance, the controller 50 commands the AC switches 54 labeled S1, S2, S3, and S4 to open, and commands the AC switches 54 (S5 and S6) to close. When using the alternative circuit topology of FIG. 2, the controller 50 commands the switches labeled SA1, SB1, and SC1 to close after commanding the remaining AC switches 54 to open. The method 100 then proceeds to block B110.

At block B110, the controller 50 applies switching control logic to the PIM 40 and drives the phase windings 148 in the particular operating mode, the returns to block B102. As block B110 is arrived at via either block B108, block B118, or block B126, execution of block B110 includes implementing switching control operations of the PIM 40, e.g., PWM, to power the low-speed, medium-speed, or high-speed operating modes, respectively.

At block B112, in a step that is analogous to block B102, the controller 50 determines if the rotary speed ($N_{10}$) is less than a second speed threshold ($N_{MS}$) corresponding to the medium-speed operating mode explained above. Such a speed threshold may be pre-recorded in memory (M) of the controller 50 and referenced in real-time by the controller 50. The method 100 proceeds to block B114 if the rotary speed ($N_{10}$) is less than the second speed threshold ($N_{MS}$), and to block B122 in the alternative.

Block B114 includes determining, via the controller 50, whether the electric machine 16 is presently operating in the low-speed or high-speed operating mode. If so, the method 100 proceeds to block B116. The method 100 instead proceeds to block B110 if the electric machine 16 is already operating in the medium-speed operating mode.

Block B116, analogously to block B106, entails executing a control loop until current in a particular phase leg 48 is zero, or within an allowable tolerance thereof, to ensure that a winding sections 148 of the particular phase leg 48 is not switched in or out of the circuit until its phase current is zero. As with block B106, block B116 may be omitted if the transient effect tradeoff is acceptable for a given application. The method 100 then proceeds to block B118.

At block B118, the controller 50 next initiates a mode transition to the medium-speed operating mode by commanding the AC switches 54 ON or OFF according to tables 60 and 70 of FIGS. 3 and 4. In the example FIG. 1 topology, the controller 50 commands the AC switches 54 (S1, S2, S5, and S6) to open, and commands the remaining two AC switches labeled S3 and S4 to close. When using the alternative circuit topology of FIG. 2, the controller 50 commands the AC switches 54 labeled SA2, SB2, and SC2 to close after commanding the remaining AC switches 54 to open. The method 100 then proceeds to block B110.

At block B122, the controller 50 determines whether the electric machine 16 is presently operating in either the low-speed or the medium-speed operating mode. If so, the method 100 proceeds to block B124. The method 100 instead proceeds to block B110 if the electric machine 16 is already operating in the high-speed operating mode.

Block B124, which is analogous to blocks B106 and B116, entails executing a control loop until the phase current in the phase leg 48 is zero, or within an allowable tolerance thereof, to ensure that a winding section of a particular electrical phase is not switched in or out of the circuit until its phase current is zero. Block B124 may be omitted if the transient effect tradeoff is acceptable for a given application, as noted above. The method 100 then proceeds to block B126.

At block B126, the controller 50 next initiates a transition to the high-speed mode by commanding the AC switches 54 ON or OFF as shown in tables 60 and 70 of FIGS. 3 and 4. In the FIG. 1 topology, the controller 50 commands the AC switches 54 labeled S3, S4, S5, and S6 to open, and commands switches S and S2 to close. When using the alternative topology of FIG. 2, the controller 50 commands the AC switches 54 (SA3, SB3, and SC3) to close, and commands the remaining AC switches 54 to open. The method 100 then proceeds to block B110.

The method 100 described above as used with the electric drive system 15 or 15A of respective FIG. 1 or 2 is intended to provide improved power and efficiency under partial load conditions relative to existing approaches. That is, the controller 50 is configured to command a binary switching state of each respective one of the AC switches 54 based on the rotary speed ($N_{10}$) of the electric machine 16 to thereby implement one of three different speed-based operating modes, and to thereby vary a conductive path from the PIM 40 to the electric machine 16 through the winding sections 148. The controller 50 thus automatically reconfigures the phase legs 48 based on the rotary speed of the electric machine 16 such that full phase windings/phase legs 48 are used at low rotary speeds to increase machine torque. Partial windings/phase legs 48 are used at medium and high rotary speeds of the electric machine 16 to increase power and efficiency. The method 100 therefore provides a solution to the problem of the tradeoff between peak torque and high-speed power due to back-electromotive force ("back-EMF") of the electric machine 16 when approaching the bus voltage as the rotational speed of the electric machine 16 increases.

In either of the illustrated topologies of FIGS. 1 and 2, the AC switches 54 may be integrated or packaged in a few different ways. Ideally, the AC switches 54 are integrated into the structure of the electric machine 16, e.g., into the phase windings or phase legs 48 thereof. In such a configuration, the PIM 40 may be an off-the-shelf power inverter device, and as such may be connected directly to the individual phase leads of the electric machine 16 in the usual manner.

However, in order to facilitate use of the present teachings with an available configuration of the electric machine 16, the AC switches 54 and the winding sections 148 may be packaged in a switching box forming the switching circuit 45 of FIG. 1, which in turn may be electrically connected to the PIM 40 and the electric machine 16 to facilitate construction of the electric drive system 15. As another alternative, the AC switches 54 may be integrally formed with the PIM 40, with the PIM 40 configured in such a manner to connect to the specific winding sections of the electric machine 16 through multiple leads. Thus, the winding sections 148 are integral to the stator, and are shown separately in FIGS. 1 and 2 solely for illustrative clarity.

Likewise, the winding sections 148 may have a predetermined turn ratio configured to provide a predetermined power or torque from the electric machine 16. For instance, when the electric machine 16 is a three-phase electric machine having first, second, and third winding sections 148 in each of its three of the phase legs, with the first winding section being closest to the PIM 40 as shown in FIGS. 1 and 2, the predetermined turn ratio of the respective first, second, and third winding sections may be 2:1:1. These and other possible advantages of the present approach will be readily appreciated by those of ordinary skill in the art in view of the forgoing disclosure.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed is:

1. An electric drive system comprising:
   a direct current ("DC") battery pack;
   a polyphase electric machine having three or more phase legs;
   a power inverter module ("PIM") having a DC-side that is connected to the battery pack, and having an alternating current ("AC")-side that is connected to the polyphase electric machine;
   a switching circuit including:
     a plurality of AC switches; and
     for each of the three or more phase legs, three or more winding sections each electrically connectable to or disconnectable from the battery pack and the PIM by operation of the plurality of AC switches; and
   a controller programmed to command a binary switching state of each respective one of the AC switches based on a rotary speed of the electric machine to thereby implement one of three different speed-based operating modes, including a low-speed operating mode, a medium-speed operating mode, and a high-speed operating mode, and to thereby vary a conductive path from the PIM to the electric machine through the winding sections, wherein:
     in the low-speed operating mode, all of the winding sections of each respective one of the phase legs are connected in series to each other and to the PIM at a first rotary speed of the electric machine via a first ON/OFF switching combination of the AC switches;
     in the medium-speed operating mode, at least two but fewer than all of the winding sections for each respective one of the phase legs is connected to the PIM at a second rotary speed of the electric machine via a second ON/OFF switching combination of the AC switches; and
     in the high-speed operating mode, only one of the winding sections for each respective one of the phase legs is connected to the PIM at a third rotary speed of the electric machine via a third ON/OFF switching combination of the AC switches.

2. The electric drive system of claim 1, wherein the electric machine has three of the phase legs, three of the winding sections for each of the phase legs, and at least six of the AC switches.

3. The electric drive system of claim 1, wherein the AC switches are Gallium nitride ("GaN"), Gallium oxide ("GaO"), or Silicon carbide ("SiC") switches.

4. The electric drive system of claim 1, wherein the controller is configured to time an opening or a closing of each of the AC switches based on a zero-crossing of a phase current of the electric machine.

5. The electric drive system of claim 1, wherein the winding sections have a predetermined turn ratio configured to provide a predetermined power or torque from the electric machine.

6. The electric drive of claim 1, wherein the electric machine is a three-phase electric machine having first, second, and third winding sections in each of three of the phase legs, the first winding section being closest to the PIM, and wherein the predetermined turn ratio of the respective first, second, and third winding sections is 2:1:1.

7. The electric drive system of claim 1, wherein the electric machine has at least twice as many of the AC switches as a number of the winding sections in each respective one of the phase legs.

8. The electric drive system of claim 7, wherein a number of the AC switches is $N=(n)(m-1)$, where (n) is the number of the winding sections in each of the phase legs, and (m) is the total number of the phase legs.

9. The electric drive system of claim 1, wherein a number of the speed-based operating modes is equal to a number of the winding sections of each of the phase legs.

10. The electric drive system of claim 1, further comprising a set of road wheels of a motor vehicle, wherein the electric machine is coupled to at least some of the set of road wheels and configured to propel the vehicle via rotation of the road wheels.

11. The electric drive system of claim 1, wherein the AC switches are integrated within the electric machine.

12. A method for controlling a polyphase electric machine in an electric drive system, the method comprising:
   providing, between a power inverter module ("PIM") and the electric machine, a plurality of alternating current ("AC") switches and, for each phase leg of the electric machine, three or more series-connectable winding sections;
   determining a rotary speed of the electric machine via a controller; and
   commanding a binary switching state of each respective one of the AC switches based on the rotary speed to thereby implement one of three different speed-based operating modes of the electric machine, and to thereby vary a conductive path from the PIM to the electric machine through one or more of the winding sections, wherein the three different speed-based operating modes include:
     a low-speed operating mode in which all of the winding sections for each respective one of the phase legs are connected to the PIM at a first rotary speed of the electric machine via a first ON/OFF switching combination of the AC switches;
     a medium-speed operating mode in which at least two but fewer than all of the winding sections for each respective one of the phase legs in series to each other and to the PIM at a second rotary speed of the electric machine via a second ON/OFF switching combination of the AC switches; and
     a high-speed operating mode in which only one of the winding sections for each respective one of the phase legs is connected to the PIM via a third ON/OFF switching combination of the AC switches.

13. The method of claim 12, wherein the AC switches are Gallium nitride ("GaN"), Gallium oxide ("GaO"), or Silicon carbide ("SiC") switches.

14. The method of claim 12, further comprising timing an opening or closing of the AC switches based on a zero-crossing of a phase current of the polyphase electric machine.

15. The method of claim 12, wherein the electric machine has three of the phase legs and at least six of the AC switches, and each of the phase legs has three of the winding sections.

16. The method of claim 15, wherein the electric machine has at least nine of the AC switches.

17. The method of claim 12, wherein a number of the speed-based operating modes is equal to a number of the winding sections of each of the phase legs.

18. The method of claim 12, wherein an electric drive system is coupled to a set of road wheels of a motor vehicle, the method further comprising powering the road wheels via the electric machine to thereby propel the motor vehicle.

\* \* \* \* \*